(12) United States Patent
Garrett

(10) Patent No.: US 9,068,557 B1
(45) Date of Patent: Jun. 30, 2015

(54) DIRECTED FLOW WIND TURBINE

(71) Applicant: Calvin Lee Garrett, Oklahoma City, OK (US)

(72) Inventor: Calvin Lee Garrett, Oklahoma City, OK (US)

( * ) Notice: Subject to any disclaimer, the term of this patent is extended or adjusted under 35 U.S.C. 154(b) by 0 days.

(21) Appl. No.: 14/335,543

(22) Filed: Jul. 18, 2014

(51) Int. Cl.
*F03D 3/04* (2006.01)

(52) U.S. Cl.
CPC .................... *F03D 3/0427* (2013.01)

(58) Field of Classification Search
CPC ....... F03D 3/04; F03D 3/0427; F03D 3/0436; F03D 3/0445; F03D 3/0463; F05B 2250/5011; F05B 2250/712
USPC ........ 415/2.1, 4.1, 4.2, 53.1, 182.1, 183–185, 415/203–205, 208.1, 224, 905, 907; 416/178, 182
See application file for complete search history.

(56) References Cited

U.S. PATENT DOCUMENTS

| | | | |
|---|---|---|---|
| 4,084,918 A * | 4/1978 | Pavlecka | 415/1 |
| 4,350,900 A | 9/1982 | Baughman | |
| 5,009,569 A * | 4/1991 | Hector et al. | 415/4.1 |
| 8,591,170 B1 | 11/2013 | Rawls | |
| 2005/0201855 A1* | 9/2005 | Fan | 415/4.1 |
| 2011/0175366 A1 | 7/2011 | Steinlechner | |
| 2011/0318167 A1* | 12/2011 | Miller | 415/121.2 |
| 2012/0124985 A1* | 5/2012 | Lei et al. | 60/398 |

FOREIGN PATENT DOCUMENTS

DE    102011014476 A1 *  7/2012

* cited by examiner

*Primary Examiner* — Dwayne J White
*Assistant Examiner* — Alexander White
(74) *Attorney, Agent, or Firm* — Plager Schack LLP

(57) ABSTRACT

A directed flow wind turbine is configured to utilize a laminar flow of an entering wind through the directed flow wind turbine and includes a plurality of rotor vanes mechanically coupled to an upper rotor ring and a lower rotor ring. A shaft is mechanically coupled to the upper rotor ring and the lower rotor ring and configured to receive torque from the plurality of rotor vanes. An upper housing plate is attached to the shaft with an upper bearing. A lower housing plate is attached to the shaft with a lower bearing. An upwind flow shield, a downwind flow shield, and a rotor protector shield are attached to the upper housing plate and the lower housing plate. Wherein dimensions of these components are controlled in order to maintain the laminar flow of the entering wind.

6 Claims, 3 Drawing Sheets

DIRECTED FLOW WIND TURBINE

BACKGROUND

The embodiments herein relate generally to devices that convert wind energy into mechanical energy. This mechanical energy can be converted into electrical power.

As used in this application laminar flow is a type of fluid (gas or liquid) flow in which the fluid travels smoothly or in regular paths, in contrast to turbulent flow, in which the fluid undergoes irregular fluctuations and mixing. Prior to embodiments of the disclosed invention, wind energy was adequately subjected to turbulent flow proximate rotor vanes. This resulted in a loss of system efficiency. The prior art includes: U.S. Patent Application Publication 2011/0175366 filed by Steinlech; U.S. Pat. No. 4,350,900 issued to Baughman; and U.S. Pat. No. 8,591,170 issued to Rawls.

Baughman and Rawls both teach a rotary machine having housing that contains a cylindrical rotor where vanes are attached to the rotor. However, Baughman and Rawls uses one or more entrances configured to have many different angles of approach on the rotor. Steinlech teaches a wind turbine having a housing that contains a cylindrical rotor where vanes are attached to the rotor. However, Steinlech is configured to allow media to leave the rotor in a perpendicular direction to flow through the rotor, which is less efficient.

SUMMARY

A directed flow wind turbine can be configured to utilize a laminar flow of an entering wind through the directed flow wind turbine. The directed flow wind turbine includes a plurality of rotor vanes that can be mechanically coupled to an upper rotor ring and a lower rotor ring. The upper rotor ring and the lower rotor ring can have a diameter. A center line can travel through a center of the upper rotor ring and the lower rotor ring. A shaft can be mechanically coupled to the upper rotor ring and the lower rotor ring and configured to receive torque from the plurality of rotor vanes. An upper housing plate can be attached to the shaft with an upper bearing. Likewise, a lower housing plate can be attached to the shaft with a lower bearing.

An upwind flow shield can be attached to the upper housing plate and the lower housing plate. The upwind flow shield can be arranged at an incline angle from a line perpendicular to the entering wind to the upwind flow shield. An offset length can be measured from the center line to a distal point on the upwind flow shield. A downwind flow shield can be attached to the upper housing plate and the lower housing plate. The downwind flow shield can be arranged at the incline angle from the line perpendicular to the entering wind to the downwind flow shield. A rotor protector shield can be attached to the upper housing plate and the lower housing plate. The offset length can be between 1.6 and 1.8 times the diameter in order to maintain the laminar flow of the entering wind.

In some embodiments, an upper shaft support can be mechanically coupled to the upper housing plate in order to stabilize the upper housing plate. A lower shaft support can be mechanically coupled to the lower housing plate in order to stabilize the upper housing plate.

An exposure angle, measured from a downwind flow shield distal point to an upwind flow shield distal point, can be between 200 and 250 degrees. The plurality of rotor vanes can further comprises 32 vanes such that 19 or 20 rotor vanes are exposed to the entering wind at any time. In some embodiments, the incline angle can be between 75 and 85 degrees in order to further maintain the laminar flow of the entering wind.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
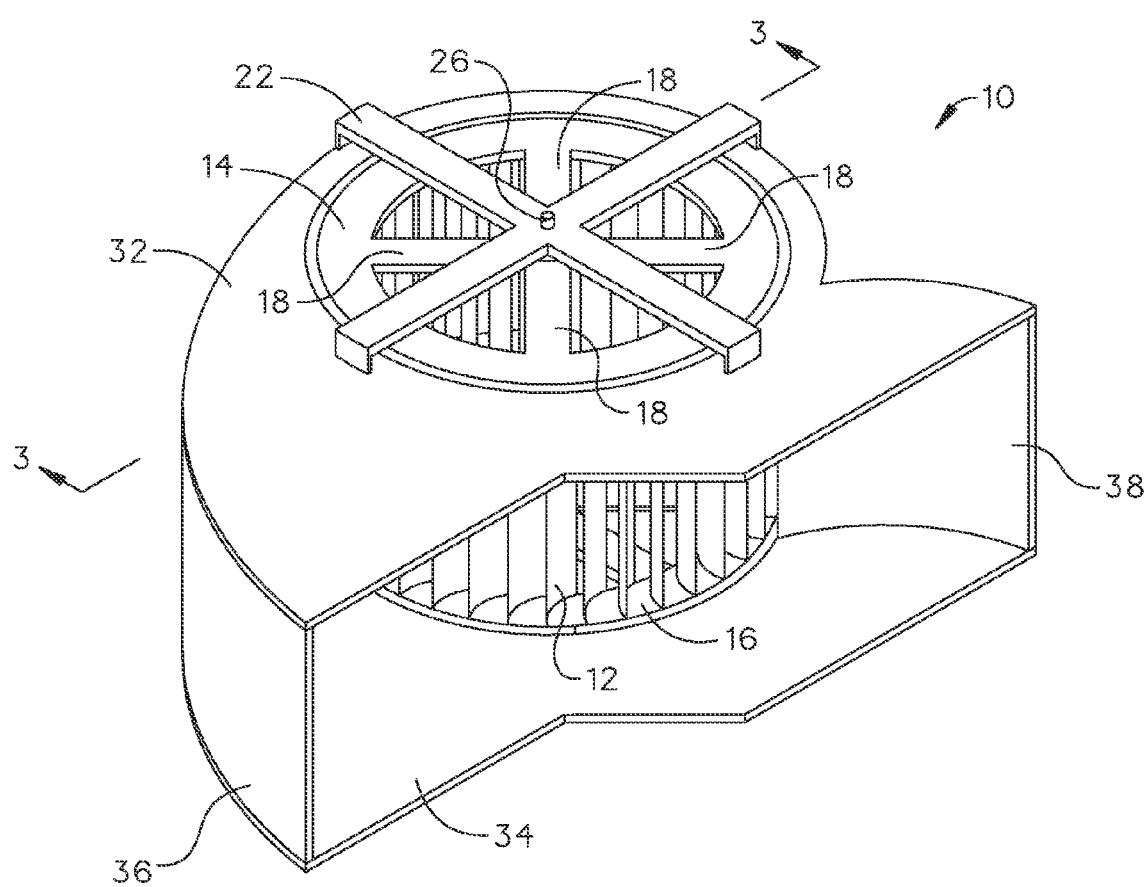
FIG. 1 is a perspective view of an embodiment of the invention
Figure 2:
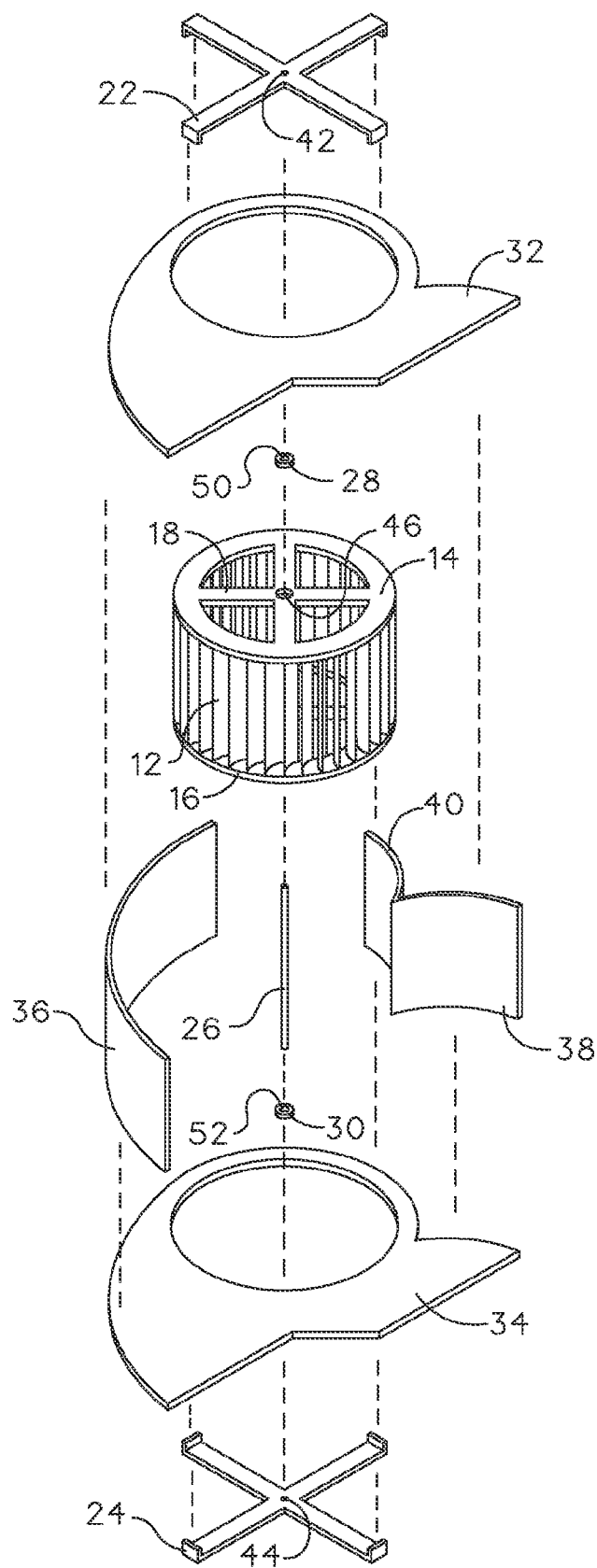
FIG. 2 is an exploded view of an embodiment of the invention
Figure 3:
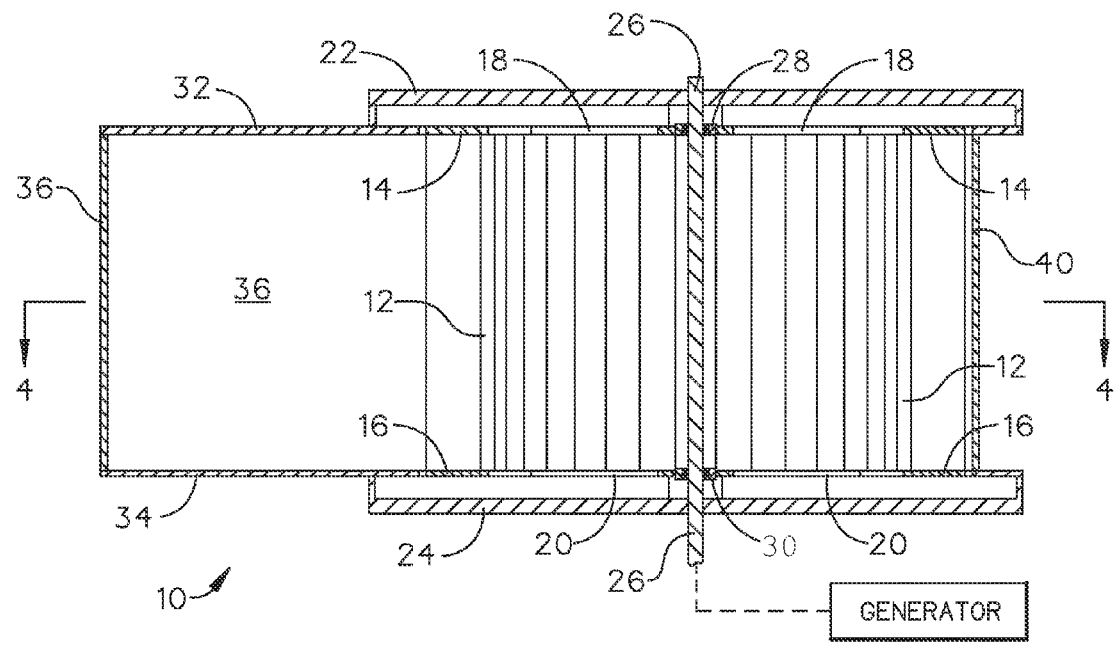
FIG. 3 is a section view of an embodiment of the invention, taken along line 3-3 in FIG. 1

By way of example, and referring to FIG. 1, FIG. 2 and FIG. 3 one embodiment of directed flow wind turbine 10 comprises a plurality of rotor vanes 12 mechanically coupled to upper rotor ring 14 and lower rotor ring 16. Upper rotor ring 14 is further mechanically coupled to upper rotor ring support elements 18. Upper rotor ring support elements 18 are mechanically coupled to upper bearing 28 having upper bearing hole 50 through upper rotor ring hole 46. Likewise, lower rotor ring 16 is further mechanically coupled to lower rotor ring support elements 20. Lower rotor ring support elements 20 are mechanically coupled to lower bearing 30 having lower bearing hole 52 through lower rotor ring hole 48.

Shaft 26 travels through upper bearing 28 and lower bearing 30. A shaft upper distal point extends through upper shaft support hole 42 in upper shaft support 22. Likewise, a shaft lower distal point extends through lower shaft support hole 44 in lower shaft support 24.

Upper shaft support 22 is mechanically coupled to upper housing plate 32. Similarly, lower shaft support 24 is mechanically coupled to lower housing plate 34. Upwind flow shield 36 is mechanically coupled to upper housing plate 32 and lower housing plate 34. Likewise, downwind flow shield 38 is mechanically coupled to upper housing plate 32 and lower housing plate 34. The space between upwind flow shield 36 and downwind flow shield 38 is free of any input obstruction. Rotor protector shield 40 is mechanically coupled to downwind flow shield 38, upper housing plate 32 and lower housing plate 34. A wind exit exists between upwind flow shield 36 and the rotor protector shield 40 such that wind exit is free of a downwind obstruction.

Figure 4:
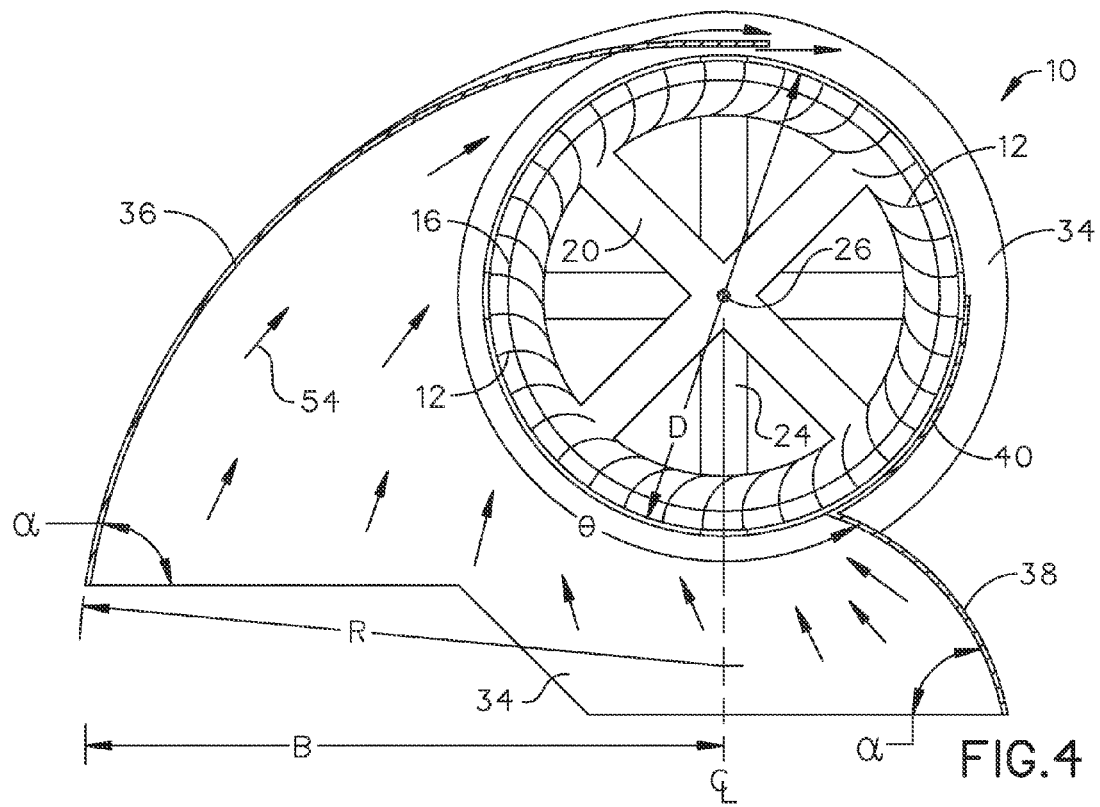
FIG. 4 is a section view of an embodiment of the invention, taken along line 4-4 in FIG. 3, illustrating the movement of the wind through the turbine.

As shown in FIG. 3 and FIG. 4, directed flow wind turbine 10 takes energy from wind 54 and coverts it into mechanical energy by turning shaft 26 while some wind escapes through a gap between plurality of rotor vanes 12 and upwind flow shield 36 without turning any of the plurality of rotor vanes 12. In some embodiments shaft 26 can be mechanically coupled to a generator to produce electrical power. The process for turning a rotating magnetic field into electrical power is very well known and is not shown here.

A design advantage of the present invention is the ability to use a greater amount of wind energy to turn the plurality of rotor vanes 12 and less wind energy is lost as turbulence by creating a laminar flow of air 56 within directed flow wind turbine 10. Experimentation has resulted in the following parameters to maximize efficiency. Incline angle α represents the angle from a line perpendicular to the entering wind to upwind flow shield 36 and downwind flow shield 38. To minimize turbulence 75 degrees≤incline angle α≤85 degrees. In the event incline angle α diverges from this preferred range, directed flow wind turbine 10 can simply be rotated to return incline angle α to the preferred range. In the preferred embodiment, incline angle α is 80 degrees.

Exposure angle θ represents the angular proportion of upper rotor ring 14 and lower rotor ring 16 which is exposed to wind 54. This is measured from a downwind flow shield distal point to an upwind flow shield distal point. To expose as many rotor vanes 12 as possible, 200 degrees≤exposure angle θ≤250 degrees. In the preferred embodiment, exposure angle θ is 225 degrees.

Another way to have wind energy directed at the plurality of rotor vanes 12 is to ensure that wind 52 is directed at the plurality of rotor vanes 12 and not upwind flow shield 36 or downwind flow shield 38. Some geometric proportioning of components can accomplish this. In particular, upper rotor ring 14 and lower rotor ring 16 are both circles having diameter D. Center line CL goes through a center of upper rotor ring 14 and lower rotor ring 16. The distance from center line CL to the distal most point of upwind flow shield 36 is offset length B. To maximize wind exposure 1.6*D≤offset length B≤1.8*D. In the preferred embodiment, B=1.7*D. Upwind flow shield 36 comprises a curved portion having radius R. Radius R is similar in length to offset length B. This provides a further benefit that the velocity of wind entering rotor vanes 12 is greater than the velocity of wind entering direct flow wind turbine 10.

Each rotor vane 12 has a rotor vane shape. The rotor vane shape can vary somewhat depending on manufacturing technique. For instance, 32 vanes are shown and 19 to 20 vanes are delivering torque to shaft 26. When the plurality of rotor vanes 12 are constructed on a roll machine the shape of the rotor vanes will probably be arcuate, as shown. However, if the plurality of rotor vanes 12 were stamped or formed in a mold, other efficient shapes could be utilized. For instance, a parabolic shape in the larger diameter rotor would allow the use of a larger number of vanes with an increase of torque delivered to shaft 26 greater than the arcuate shaped vanes.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A directed flow wind turbine, configured to utilize a laminar flow of an entering wind through the directed flow wind turbine; the directed flow wind turbine comprising:
    a plurality of rotor vanes mechanically coupled to an upper rotor ring and a lower rotor ring; wherein the upper rotor ring and the lower rotor ring have a diameter; wherein a center line travels through a center of the upper rotor ring and the lower rotor ring;
    a shaft, mechanically coupled to the upper rotor ring and the lower rotor ring and configured to receive torque from the plurality of rotor vanes;
    an upper housing plate, attached to the shaft with an upper bearing;
    a lower housing plate, attached to the shaft with a lower bearing;
    an upwind flow shield, attached to the upper housing plate and the lower housing plate; such that a gap exists between the upwind flow shield and the plurality of rotor vanes which enables some wind to escape the directed flow wind turbine without turning the plurality of rotor blades and ensures laminar flow of wind in the plurality of rotor blades; wherein the upwind flow shield is arranged at an incline angle from a line perpendicular to the entering wind to the upwind flow shield; wherein an offset length is measured from the center line to a distal point on the upwind flow shield;
    a downwind flow shield, attached to the upper housing plate and the lower housing plate; wherein the downwind flow shield is arranged at the incline angle from the line perpendicular to the entering wind to the downwind flow shield; wherein an air entrance between the downwind flow shield and the upwind flow shield is unobstructed;
    a rotor protector shield, attached to the upper housing plate and the lower housing plate;
    a wind exit between the upwind flow shield and the rotor protector shield such that wind exit is free of a downwind obstruction;
    wherein the offset length is between 1.6 and 1.8 times the diameter in order to maintain the laminar flow of the entering wind.

2. The directed flow wind turbine of claim 1, further comprising an upper shaft support, mechanically coupled to the upper housing plate in order to stabilize the upper housing plate.

3. The directed flow wind turbine of claim 2, further comprising a lower shaft support, mechanically coupled to the lower housing plate in order to stabilize the lower housing plate.

4. The directed flow wind turbine of claim 1, wherein an exposure angle, measured from a downwind flow shield distal point to an upwind flow shield distal point is between 200 and 250 degrees.

5. The directed flow wind turbine of claim 4, wherein the plurality of rotor vanes further comprises 32 rotor vanes such that 19 or 20 rotor vanes are exposed to the entering wind at any time.

6. The directed flow wind turbine of claim 1, wherein the incline angle is between 75 and 85 degrees in order to further maintain the laminar flow of the entering wind.

\* \* \* \* \*